(12) United States Patent
Sutton et al.

(10) Patent No.: US 9,916,697 B2
(45) Date of Patent: Mar. 13, 2018

(54) AUTOMATIC USAGE TRACKER FOR RESPIRATOR

(71) Applicant: Strategic Solutions, LLC, Cleveland, TN (US)

(72) Inventors: Aubrey Scott Sutton, Cleveland, TN (US); Michael Jason Gilbert, Cleveland, TN (US)

(73) Assignee: Strategic Solutions, LLC, Cleveland, TN (US)

( * ) Notice: Subject to any disclaimer, the term of this patent is extended or adjusted under 35 U.S.C. 154(b) by 0 days.

(21) Appl. No.: 15/285,131

(22) Filed: Oct. 4, 2016

(65) Prior Publication Data

US 2017/0109943 A1    Apr. 20, 2017

Related U.S. Application Data

(60) Provisional application No. 62/243,370, filed on Oct. 19, 2015.

(51) Int. Cl.

| | |
|---|---|
| *G08B 13/14* | (2006.01) |
| *G07C 1/02* | (2006.01) |
| *A62B 25/00* | (2006.01) |
| *A62B 9/00* | (2006.01) |
| *B65D 25/02* | (2006.01) |
| *B65D 43/16* | (2006.01) |
| *B65D 81/18* | (2006.01) |
| *G06K 7/10* | (2006.01) |

(52) U.S. Cl.
CPC ............... *G07C 1/02* (2013.01); *A62B 9/006* (2013.01); *A62B 25/00* (2013.01); *B65D 25/02* (2013.01); *B65D 43/16* (2013.01); *B65D 81/18* (2013.01); *G06K 7/10366* (2013.01)

(58) Field of Classification Search
CPC ...... G07C 1/02; G06K 7/10366; B65D 43/16; B65D 81/18; B65D 25/02; A62B 25/00; A62B 9/006
USPC .................... 340/572.1, 5.1, 10.1, 10.4, 521; 455/456.1; 600/410, 437
See application file for complete search history.

(56) References Cited

U.S. PATENT DOCUMENTS

| | | | |
|---|---|---|---|
| 9,643,488 B2 * | 5/2017 | Seong | B60L 11/182 |
| 2011/0227700 A1 * | 9/2011 | Hamerly | A62B 9/006 340/10.1 |
| 2012/0049802 A1 * | 3/2012 | Barsukov | G01R 31/3651 320/136 |
| 2012/0153711 A1 * | 6/2012 | Minato | B60T 13/662 303/10 |
| 2015/0218987 A1 * | 8/2015 | Minato | B01D 53/0407 96/113 |

\* cited by examiner

*Primary Examiner* — Dhaval Patel

(74) *Attorney, Agent, or Firm* — Chambliss, Bahner & Stophel, P.C.

(57) ABSTRACT

A respirator container includes a sealable chamber that is adapted to receive and contain a respirator having a unique identifying tag. The respirator container also includes a reader for reading the unique identifying tag of a respirator in the sealable chamber, and a timer for measuring the time during which a respirator is outside of the sealable chamber.

12 Claims, 22 Drawing Sheets

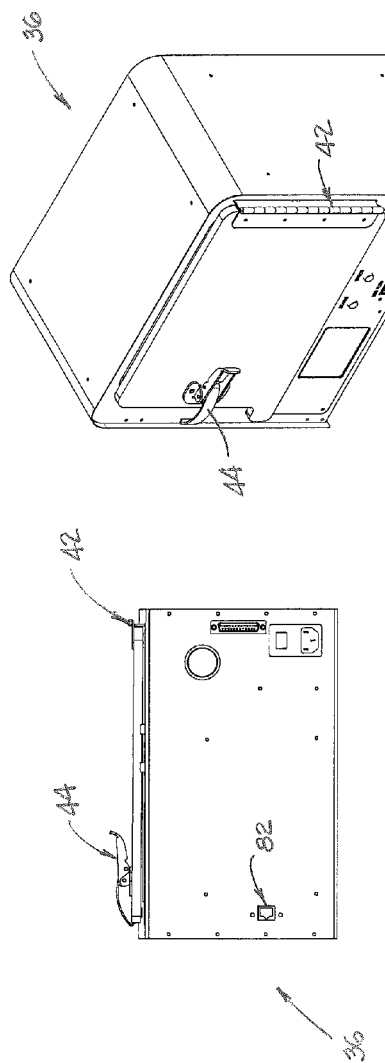
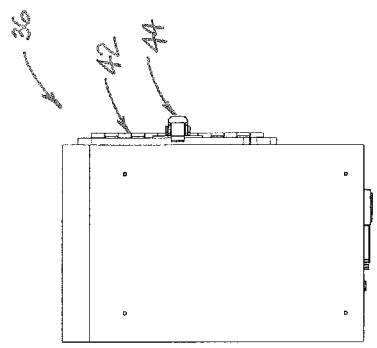
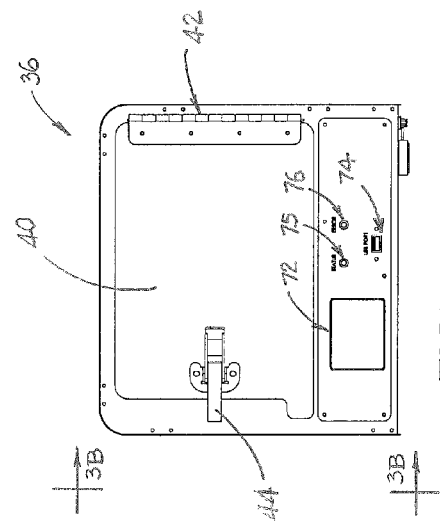
FIGURE 3D
FIGURE 3B
FIGURE 3C
FIGURE 3A

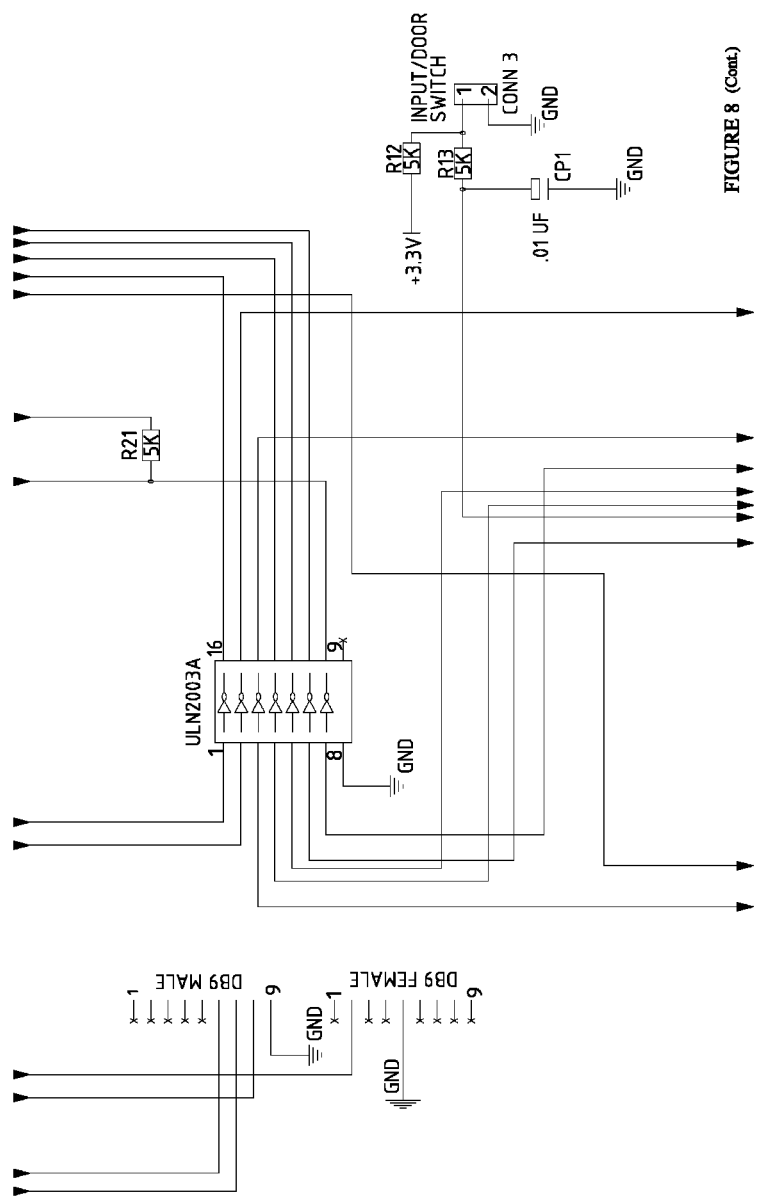

AUTOMATIC USAGE TRACKER FOR RESPIRATOR

CROSS-REFERENCE TO RELATED APPLICATION

This application claims the benefit of U.S. Provisional Patent Application No. 62/243,370 which was filed on Oct. 19, 2015.

FIELD OF THE INVENTION

The invention relates to methods and devices for containing and measuring the time of use of a respirator that is restricted to use for only a specified period of time.

BACKGROUND OF THE INVENTION

Industrial, construction, manufacturing and automotive repair activities sometimes create or are carried out in environments containing dust or chemical fogs, fumes, mists, gases, smokes, sprays or vapors. A variety of known diseases are caused by breathing air contaminated with these harmful agents. In order to prevent these diseases in employees, engineering control measures, such as enclosure or confinement of the working operation, general and local ventilation, and substitution of less toxic materials, may be employed. When effective engineering controls are not feasible, or while they are being instituted, the Occupational Safety and Health Administration ("OSHA") of the United States Department of Labor requires that appropriate respirators be used by affected employees. Essentially, OSHA requires that a suitable respirator be provided to each employee when such equipment is necessary to protect the health of the employee. Furthermore, it is required that the employer provide a respirator which is applicable and suitable for the occupational purpose in connection with which it is used.

Respirators that are used in a work environment are conventionally packaged in airtight, resealable containers. They are rated for a particular time of exposure or "service time", and may only be used for the rated service time, after which they must be discarded. When in use, they are considered to be "exposed" and this exposure time is deducted from the total service time. OSHA regulations require that the employer establish and maintain a respiratory protection program which covers each employee required to use a respirator. This program must require that each respirator be kept in an airtight container when not in use and that the cumulative period of use be tracked so that the respirator may be retired when the rated service time has expired. Consequently, most employers require that respirators be resealed in their original airtight containers when not in use, and that the time of exposure be manually recorded by the operator or another individual responsible for maintaining required safety records involving operator exposure.

Recent regulations by OSHA have required much more stringent tracking of operator exposure to airborne contaminants. Because current methods of tracking and record keeping typically involve manually tracking, recording and archiving operator respirator usage, errors are common. In addition, employees may not be diligent about resealing their respirators in airtight containers when not in use. It would be desirable if a method and apparatus could be developed that would automate the system of tracking and recording respirator usage in such a way as to require that the respirator be placed in a sealed chamber when not in use. Such a method and apparatus would provide an operator much better protection from breathing harmful airborne contaminates, therefore promoting a much healthier work experience. Furthermore, it would make it easier to demonstrate compliance with the existing regulations.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic. All methods described herein can be performed in any suitable order unless otherwise specified herein or clearly indicated by context.

Terms concerning attachments, coupling and the like, such as "connected" and "interconnected", refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity. Several terms are specifically defined herein. These terms are to be given their broadest possible construction consistent with such definitions, as follows:

As used herein, the term "replaceable filtration cartridge" means a cartridge or other container with a filter, sorbent, catalyst, or combination thereof which removes contaminants from the air that is passed therethrough.

As used herein, the term "respirator" means a wearable filtration device that is (or has one or more replaceable filtration cartridges which are) rated to provide adequate respiratory protection for a specified service period (as hereinafter defined).

As used herein, the terms "sealable", "sealed" and similar terms, when used to describe or refer to a chamber of a respirator container, refers to a condition by which air and any contaminants contained or entrained therein are substantially prevented from passing into or out of the chamber.

As used herein, the term "service period" means the period of time that a particular respirator or the replaceable filtration cartridge for a particular respirator is rated to provide adequate respiratory protection. When the service period has elapsed, the respirator or the replaceable filtration cartridge must be retired from further use. The term "service period for a particular respirator" means the service period for a particular respirator or for the replaceable filter cartridge employed in a particular respirator.

SUMMARY OF THE INVENTION

The invention comprises a method and apparatus for accurately tracking the usage of a respirator that is restricted to use for a specified service period. The apparatus comprises a respirator container which includes a sealable chamber that is adapted to receive and contain a respirator having a unique identifying tag. The respirator container also includes a reader for reading the unique identifying tag of a respirator in the sealable chamber, and a timer for measuring the time during which a respirator is outside of the sealable chamber.

A preferred embodiment of the invention includes a user interface by which a user may enter the service period for a particular respirator, and a controller that is operatively attached to the reader, the timer and the user interface. In this embodiment of the invention, the controller is adapted to determine when the unique identifying tag of a particular respirator has been out of the sealable chamber for an amount of time equal to the service period for the particular respirator and to provide notice of the occurrence of this event by means of the user interface.

The preferred embodiment of the invention provides continuous time monitoring while a respirator is outside of the sealable chamber and provides notice when the service period for a particular respirator has expired. The controller in this embodiment of the invention is adapted to generate a report of the amount of time a particular respirator has been out of the sealable chamber for each respirator issued to an employee.

In order to facilitate an understanding of the invention, the preferred embodiments of the invention, as well as the best mode known by the inventors for carrying out the invention, are illustrated in the drawings, and a detailed description thereof follows. It is not intended, however, that the invention be limited to the particular embodiments described or to use in connection with the particular respirator illustrated herein. Therefore, the scope of the invention contemplated by the inventors includes all equivalents of the subject matter described herein, as well as various modifications and alternative embodiments such as would ordinarily occur to one skilled in the art to which the invention relates. The inventors expect skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiments of the invention are illustrated in the accompanying drawings, in which like reference numerals represent like parts throughout, and wherein:

FIG. 3A is a front view of a second embodiment of the invention that is similar to the embodiment shown in FIG. 2, except that the door of the respirator container does not have a transparent window.

FIG. 3B is a side view of the embodiment of the invention shown in FIG. 3A, taken along line 3B-3B of FIG. 3A.

FIG. 3C is a bottom view of the embodiment of the invention shown in FIGS. 3A and 3B.

FIG. 3D is a front perspective view of the embodiment of the invention shown in FIGS. 3A-3C.

DETAILED DESCRIPTION OF THE PREFERRED EMBODIMENTS

Figure 1:
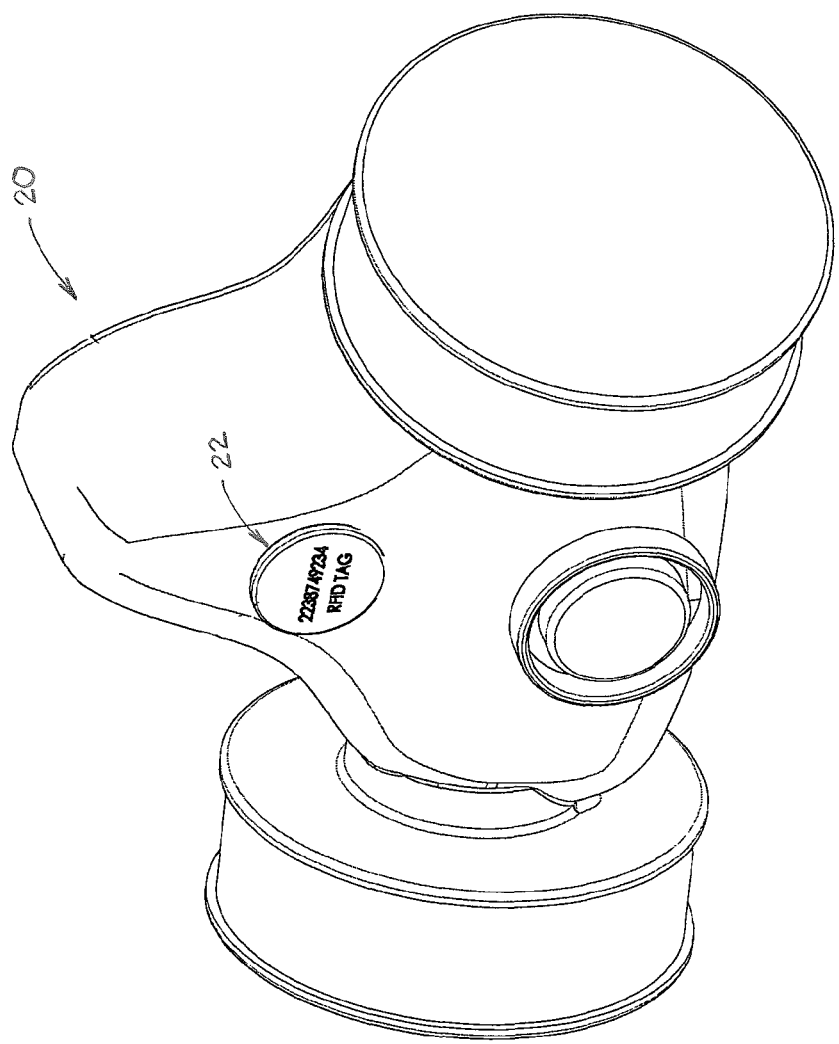
FIG. 1 is a perspective view of a respirator such as may be used in connection with the invention.

This description of preferred embodiments of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

Figure 2:
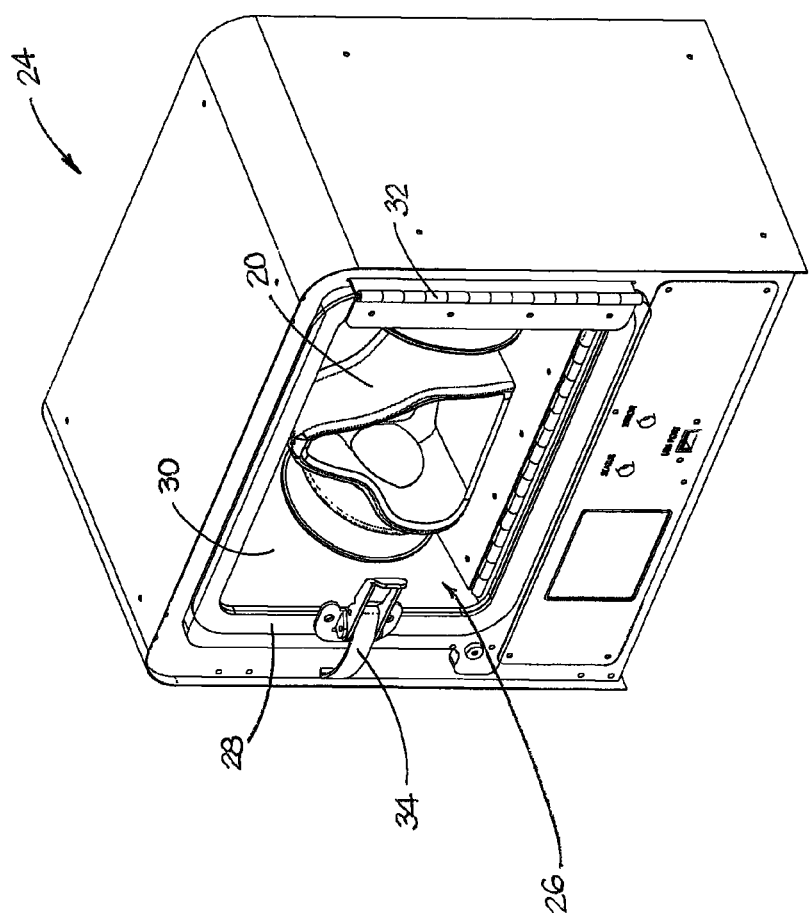
FIG. 2 is a perspective view of a first embodiment of the invention, showing the respirator of FIG. 1 in the sealable chamber.

FIG. 1 shows respirator 20 to which a unique identifying tag, in the form of radio frequency identification device ("RFID") tag 22, is attached. FIG. 2 shows a first embodiment 24 of a respirator container comprising a sealable chamber 26 that is adapted to receive and contain a respirator such as respirator 20 to which RFID tag 22 is attached. Respirator container 24 includes door 28 for sealable chamber 26 which may be opened to provide access to the interior thereof and closed to seal the sealable chamber. Door 28 includes transparent window 30, hinge 32 and latch 34 which allows the door to be tightly closed to seal the sealable chamber. FIGS. 3A-5 show a second embodiment 36 of a respirator container comprising a sealable chamber 38 that is adapted to receive and contain a respirator such as respirator 20 to which RFID tag 22 is attached. Respirator container 36 is substantially similar to respirator container 24, except that its door 40 for sealable chamber 38, which may be opened to provide access to the interior thereof (as shown in FIG. 5) and closed to seal the sealable chamber (as shown in FIGS. 3A-3D), does not include a transparent window such as window 30 of door 28. Door 40 includes hinge 42 and latch 44 which allows the door to be tightly closed to seal the sealable chamber.

Figure 4:
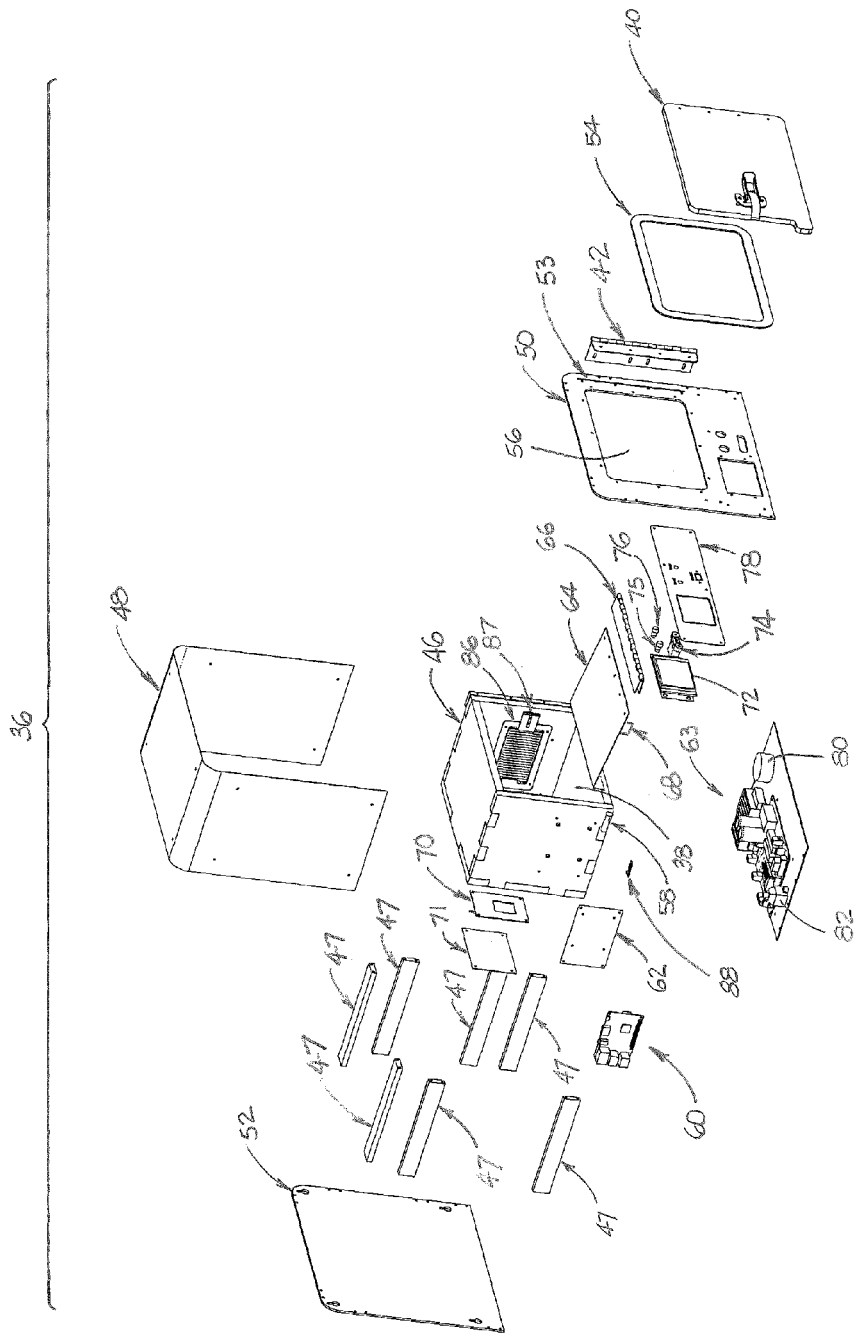
FIG. 4 is an exploded view of the embodiment of the invention shown in FIGS. 3A-3D.
Figure 5:
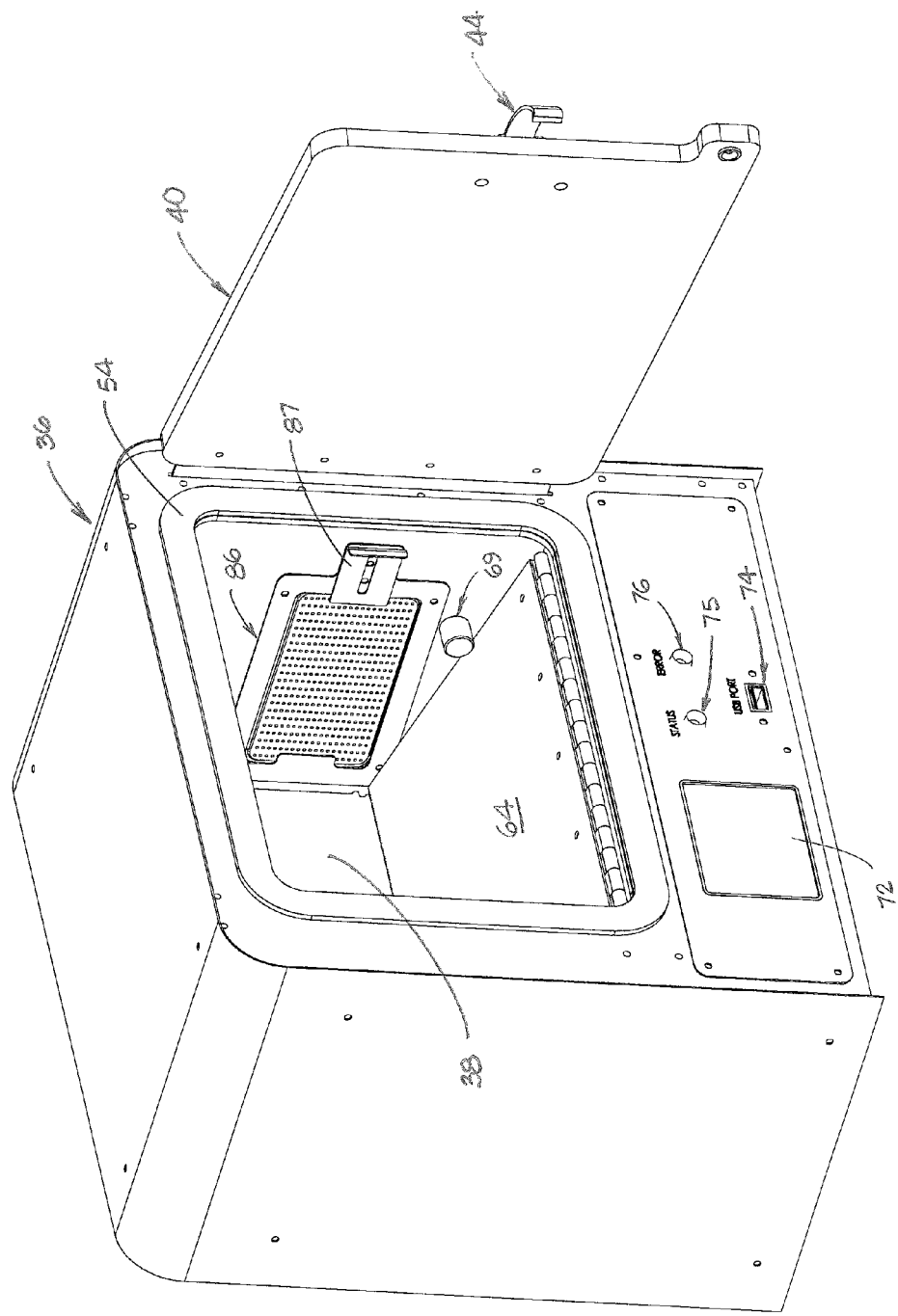
FIG. 5 is a front perspective view of the embodiment of the invention shown in FIGS. 3A-4, showing the door in the open position.

As shown in FIG. 4, respirator container 36 comprises sealable chamber 38 formed by open box structure 46. A plurality of structural supports 47 are attached to the outside of open box structure 46 and outer cabinet 48 is attached thereto. Inner front panel 50 is attached to the front side of open box structure 46 and rear panel 52 is attached to the rear side of open box structure 46. Hinge 42, to which door 40 is attached, extends through slot 53 in inner front panel 50 and is attached to the side of open box structure 46. Closed cell gasket 54 is placed around the periphery of opening 56 in inner front panel 50 to allow door 40 to seal, in cooperation with other structures described herein, sealable chamber 38 within open box structure 46. A door switch, preferably comprising magnetic reed switch 58, is adapted to sense whether door 40 is open or closed and is operatively connected to processor 60. Processor 60 is mounted on mount plate 62, which is located on the outside of open box structure 46 and inside outer cabinet 48.

Power supply board 63 includes an input/output section that is adapted to cooperate with processor 60 in the operation of respirator container 36. The combination of the input/output section of power supply board 63 and processor 60 is referred to hereinafter as the "controller". The controller is adapted to support all of the software required to operate respirator container 36.

The door switch is adapted to signal the controller that the door is open or closed. In the bottom of open box structure 46 is a hinged platen comprised of platen 64 to which spring-loaded hinge 66 is attached. A respirator-detecting sensor comprising magnetic reed sensor 68 is preferably operatively attached to the hinged platen and to the controller, and is adapted to signal the controller that a respirator is or is not in the sealable chamber. Mechanical stop 69 (shown in FIG. 5) prevents the hinged platen from moving too far upwardly when a respirator is removed from the sealable chamber. RFID reader 70 is attached to the back of open box structure 46 and secured by attachment plate 71. RFID reader 70 is adapted to read RFID tag 22 that is attached to respirator 20, and to signal the controller that a previously registered respirator, such as respirator 20, has been placed in sealable chamber 38.

A user interface comprises touch panel 72, USB port 74, and a pair of informational LED lights 75 and 76 that are operatively attached to the controller and also attached so as to be displayed through suitable openings in outer front panel 78 below open box structure 46. A user may enter information into the controller by means of touch panel 72 or by means of a keyboard (not shown) connected to the controller through USB port 74. USB port 74 may also be used to download internally saved respirator usage files stored in the controller to an external device. The controller is adapted to provide notice of the occurrence of certain events by actuating informational LED lights 75 and 76 and/or by providing a notice signal on touch panel 72. As shown in FIG. 5, LED light 75 comprises a status indicator that is preferably green and LED light 76 comprises an error indicator that is preferably red. Also comprising part of the user interface is audible alarm 80 and Ethernet port 82 that are mounted on power supply board 63. Ethernet port 82 provides a portal by which respirator tracking reports generated by the controller may be sent to a designated email address.

The input/output section of power supply board 63 is adapted to receive information from door switch 58, respirator-detecting sensor 68 and RFID reader 70 and transmit this information to processor 60. This section of power supply board 63 may also be adapted to provide output to informational LED lights 75 and 76 as well as to audible alarm 80 in order to provide audible informational alarms to a user. The controller, i.e., the combination of input/output section of power supply board 63 and processor 60, is adapted to support all of the software required to operate the user interface of respirator container 36.

The user interface allows a user to enter information into the controller and to otherwise communicate with the controller of respirator container 36 as deemed desirable. The controller includes a timer that is adapted to measure the period of time during which a respirator is outside sealable chamber 38, as indicated by input from sensor 68 and RFID reader 70. The timer is also adapted to measure the period of time during which door 40 is open, as indicated by input from switch 58. Using this information, the controller is adapted to track the cumulative time that a respirator having a unique identifying tag is outside of the sealable chamber, and to compare this cumulative amount of time with the service period for the respirator.

In order to initiate tracking of the usage of a particular respirator, a user places a respirator with a unique identifying RFID tag in the sealable chamber, verifies that RFID reader 70 can read the tag associated with the respirator and enters information about the respirator including its rated service period into the controller. The controller will then associate the RFID tag it is reading with a record for that respirator. This will allow the controller to track the cumulative time that the identified respirator is outside of the sealed chamber. Preferably, the controller provides continuous tracking information for a respirator such as respirator 20 to which RFID tag 22 is attached through touch panel 72. The controller is adapted to determine when the unique RFID tag of a particular respirator has been out of sealable chamber 38 for an amount of time equal to the service period for that respirator, and to provide notice of the occurrence of this event by means of the user interface. It is also preferred that the controller provide notice via the user interface that the unique RFID tag of a particular respirator has been out of the sealable chamber for an amount of time equal to the service period for the particular respirator less a predetermined warning period such as, for example, thirty minutes. This will allow a user of the respirator to be prepared for its reaching the end of its service period.

In some embodiments of the invention, the respirator container includes a dryer that is operatively connected to the controller and adapted to reduce the humidity level within the sealable chamber. The dryer may comprise a heating element or a replaceable dryer element such as dryer element 86 that is held in place by retaining clip 87. Replaceable dryer element 86 may comprise a silica gel cartridge. Some such silica gel cartridges can be reused when saturated with moisture by placing them in an oven to evaporate the moisture. Others can be plugged into an ordinary household electrical outlet for a period of time. Still others must be discarded when saturated. When the respirator container includes a dryer, it will also include humidity sensor 88, which is operatively connected to the controller and adapted to determine the humidity level within the sealable chamber. The controller is adapted to activate the dryer when the humidity level in the sealable chamber is above a predetermined humidity limit. If the dryer comprises a replaceable dryer element, the controller is adapted to provide notice via the user interface that the dryer element needs to be replaced if the humidity level in the sealable chamber remains above the predetermined humidity limit after the dryer has been activated for a predetermined dryer time period such as, for example, thirty minutes.

Figure 6:
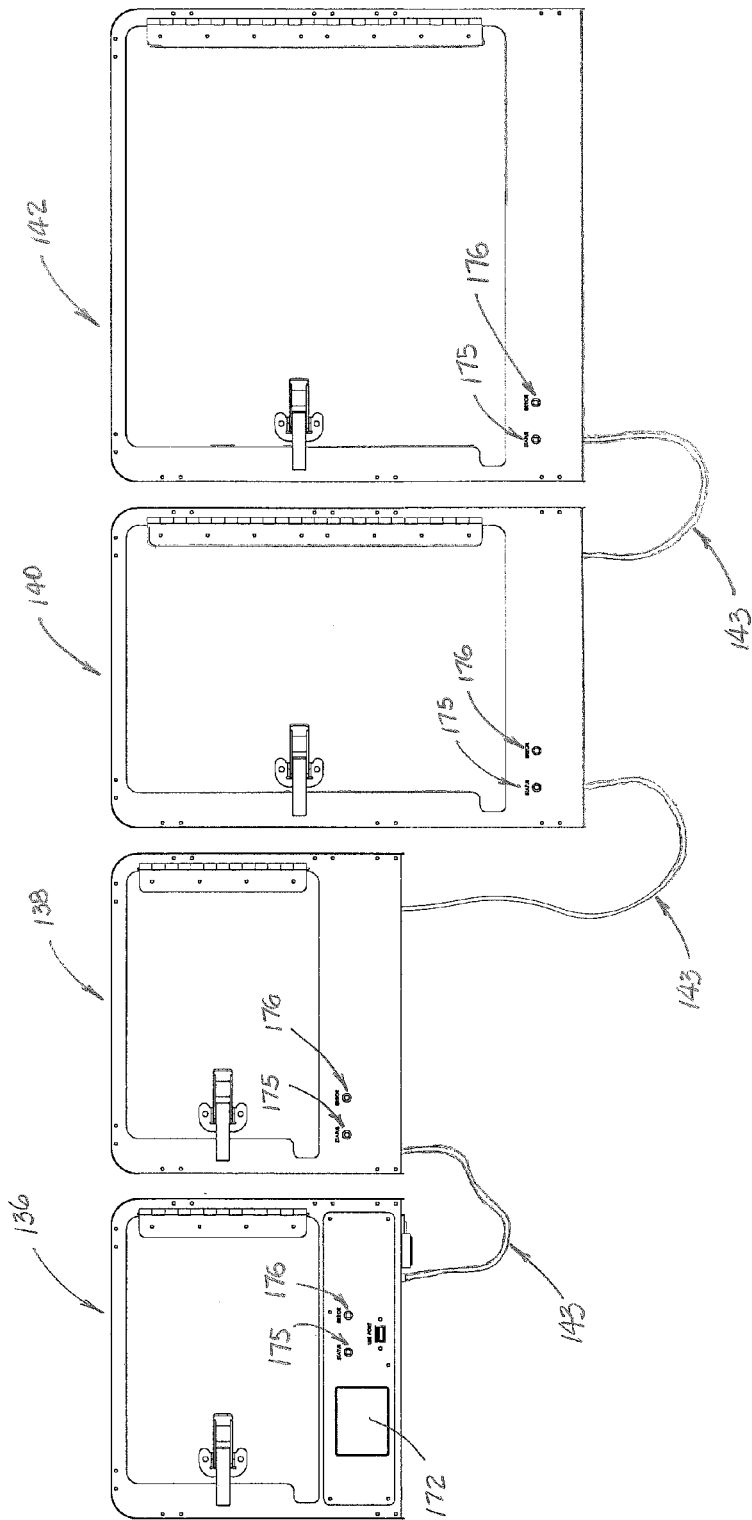
FIG. 6 is a front view of a third embodiment of the invention, showing a plurality of sealable chambers that are operatively connected together.
Figure 7:
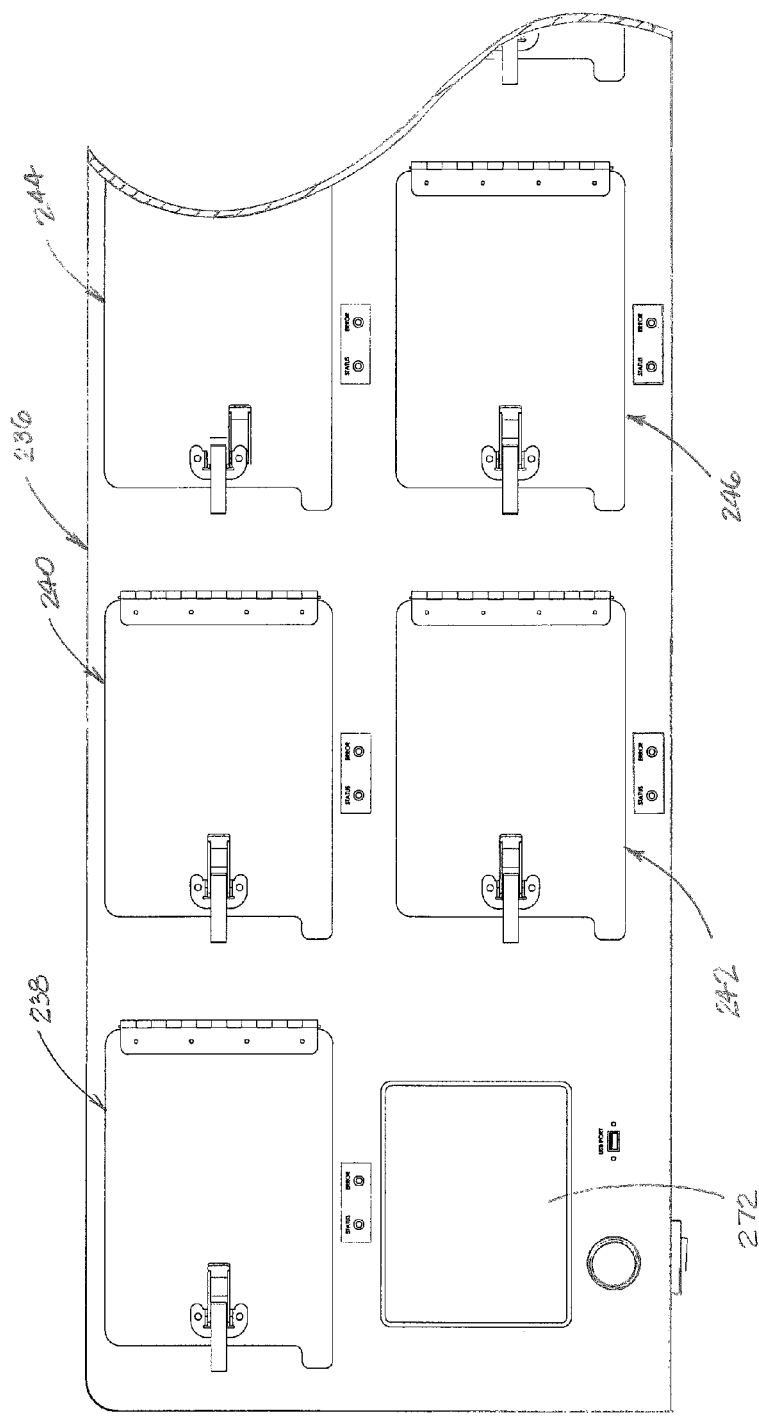
FIG. 7 is a front view of a fourth embodiment of the invention, showing a plurality of sealable chambers in a common cabinet.

A third embodiment of the invention is shown in FIG. 6. In this embodiment, master unit 136, which is essentially identical to respirator container 36, is electrically connected, directly or indirectly, to slave units 138, 140 and 142 by a plurality of expansion cables 143. This connection permits power and data to be transferred from master unit 136 to each of the slave units, and it also permits the transfer of data from each slave unit to master unit 136. The user interface in this arrangement includes touch panel 172 (which is substantially similar to touch panel 72 in respirator container 36) in the master unit, and LED indicator lights 175 and 176 (which are substantially similar to LED lights 75 and 76, respectively, in respirator container 36) in each unit. As shown in FIG. 6, the slave units may be provided with differently sized sealable chambers in order to accommodate respirators of different sizes and types. In the embodiment of the invention shown in FIG. 6, the controller in unit 136, which is substantially the same as the controller in respirator container 36, is adapted to control master unit 136 and the various slave units 138, 140 and 142. Of course, additional slave units with various sizes of sealable chambers, could also be added. A fourth embodiment of the invention is illustrated in FIG. 7, in which a common cabinet 236 contains multiple sealable chambers, including chambers 238, 240, 242, 244 and 246. In this embodiment of the invention, a single controller, operatively connected to touch panel 272, is adapted to control all of the sealable chambers.

Figure 8:
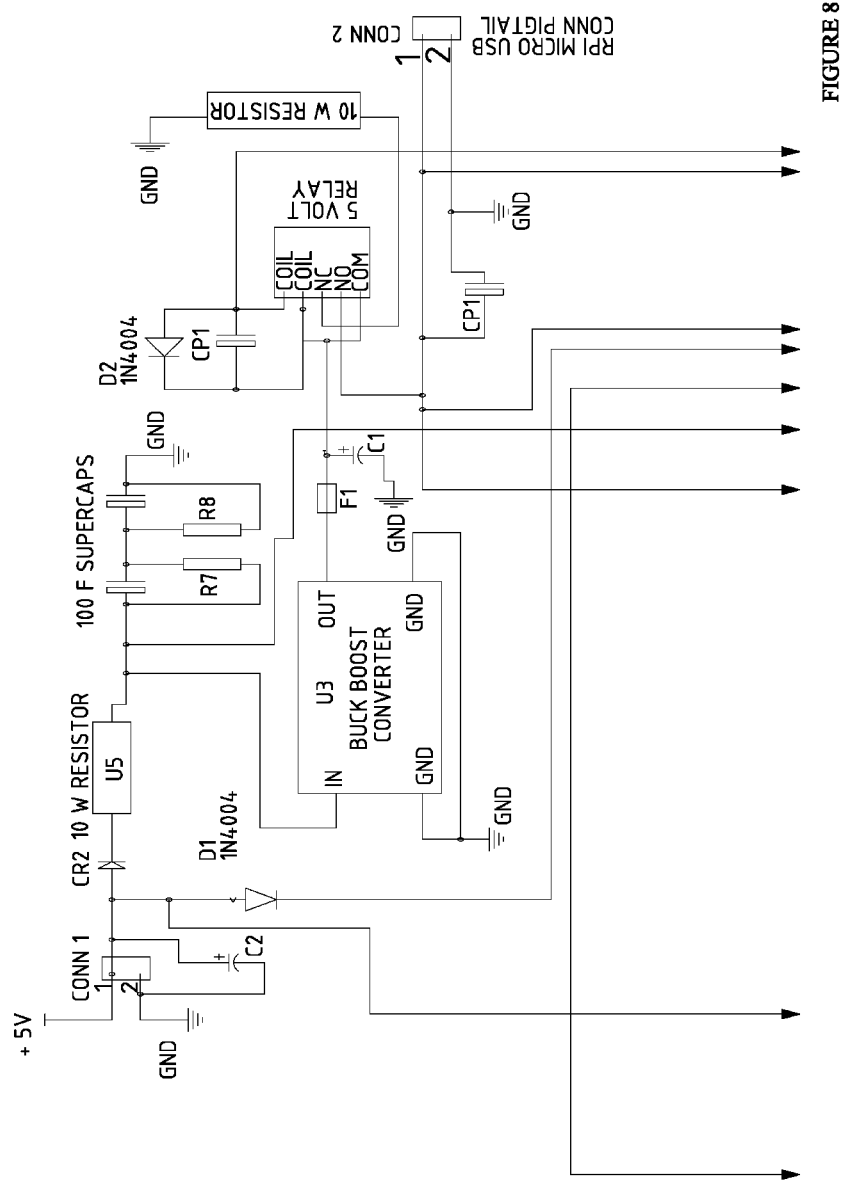
FIG. 8 is the electrical wiring diagram for first embodiment of the invention shown in FIG. 2 or the second embodiment of the invention shown in FIGS. 3A-5.
Figure 8:
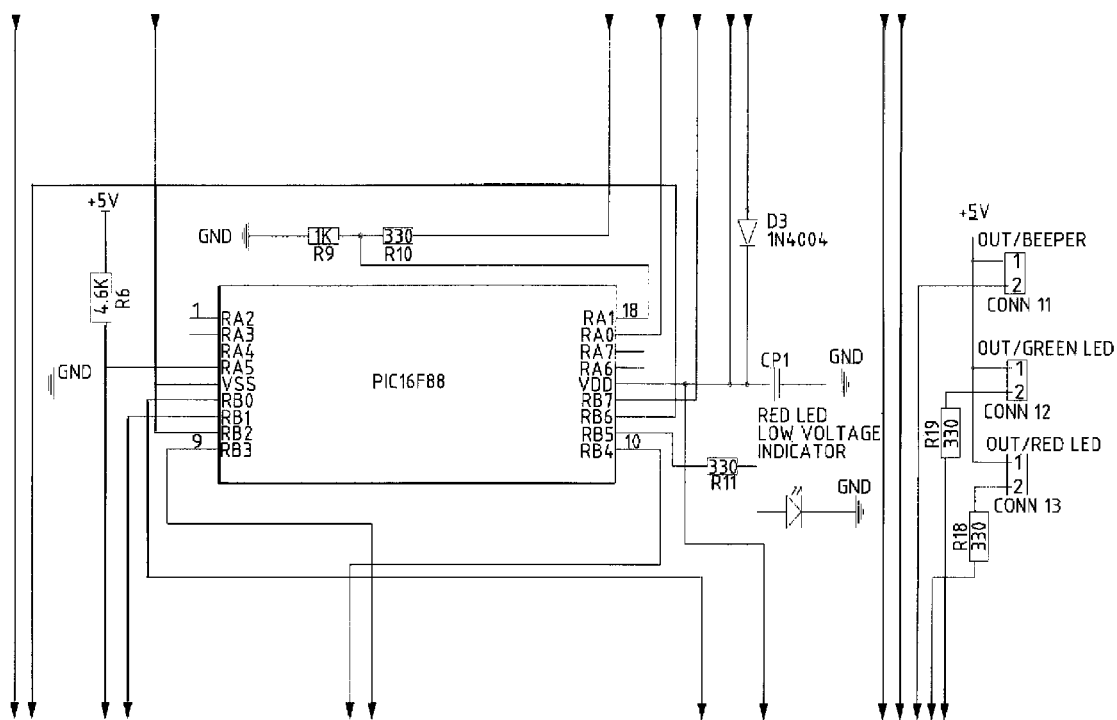
Figure 8:
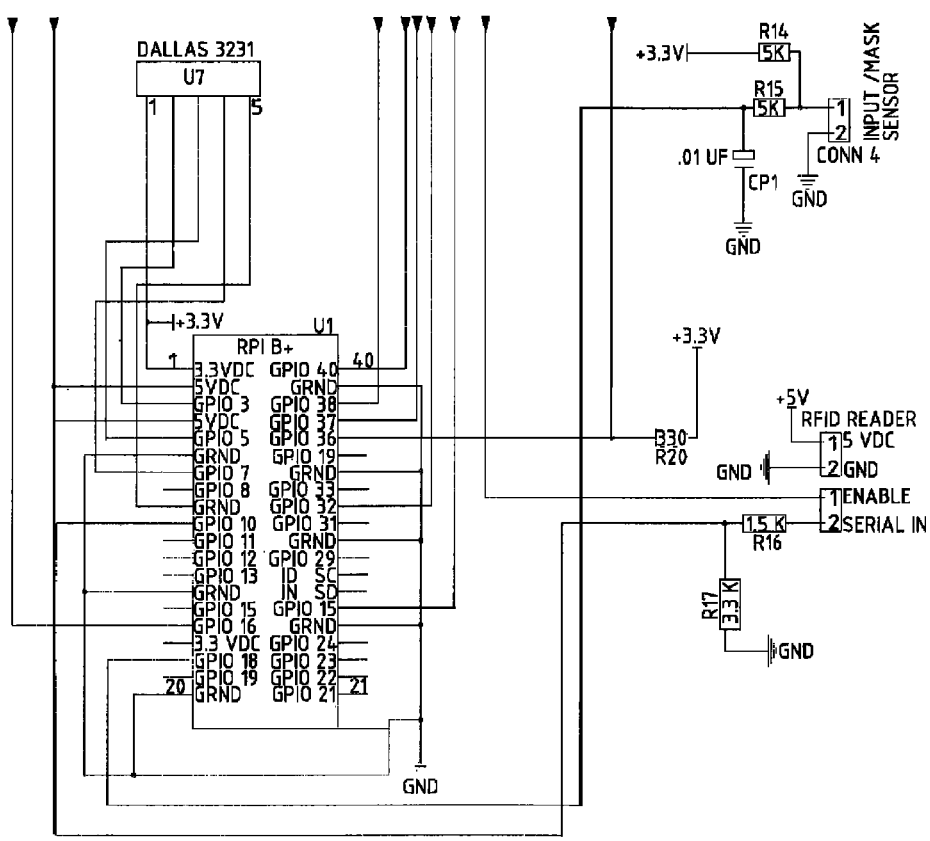
Figure 9:
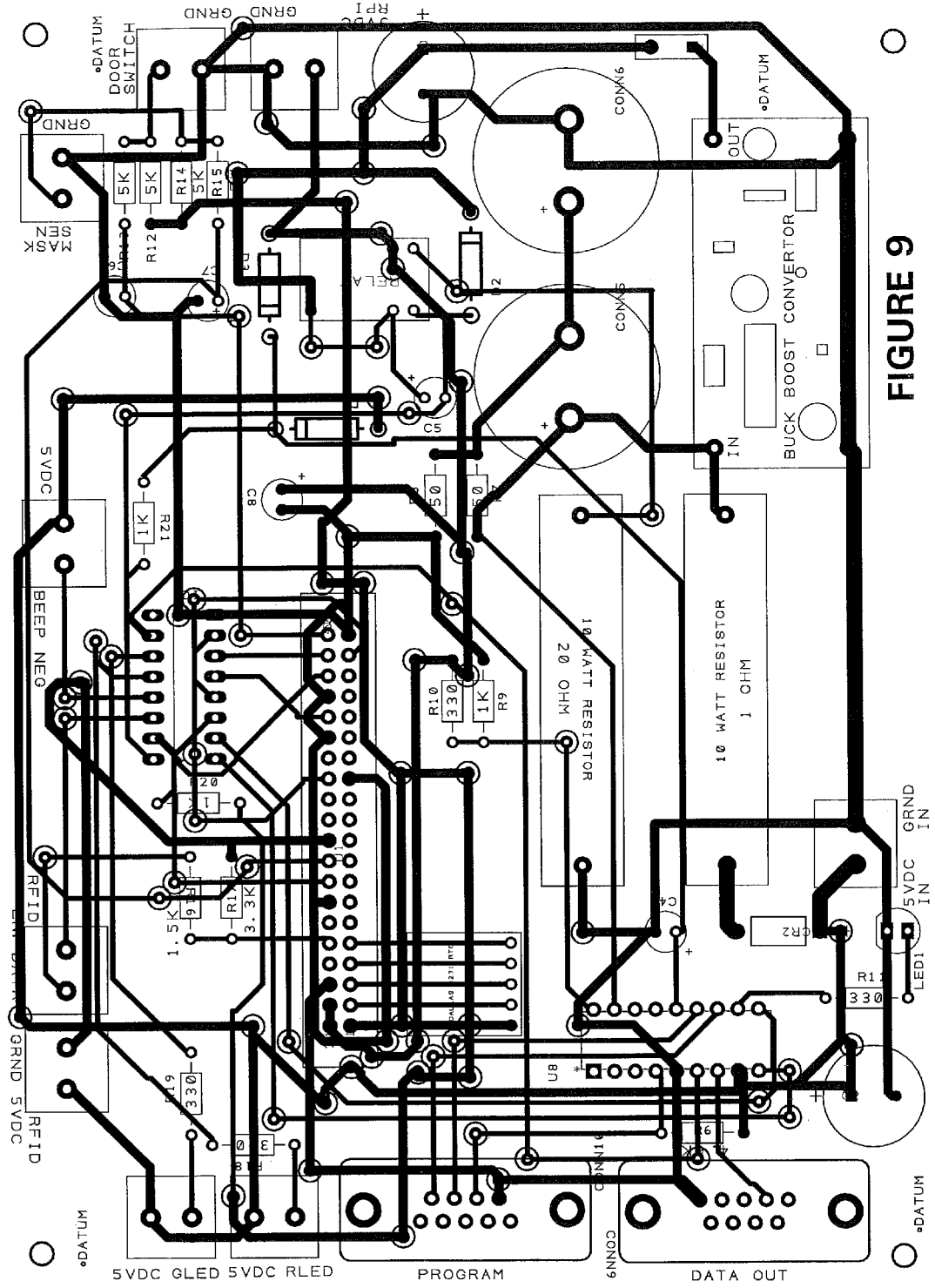
FIG. 9 is the electrical schematic of a preferred embodiment of the power supply/input/output component for the first embodiment of the invention shown in FIG. 2 or the second embodiment of the invention shown in FIGS. 3A-5.

FIG. 8 shows the electrical wiring diagram for first embodiment of the invention shown in FIG. 2 or the second embodiment of the invention shown in FIGS. 3A-5, and FIG. 9 shows the electrical schematic of a preferred embodiment of the power supply/input/output and processor components for the first embodiment of the invention shown in FIG. 2 or the second embodiment of the invention shown in FIGS. 3A-5.

Referring again to FIGS. 3A-5, when respirator container 36 is activated, power supply board 84 will charge a capacitor bank or other power supply component (not shown in FIGS. 3A-5) to provide enough power to safely run and shut down the system. Once the power supply component is charged, the controller will check an internal clock and provide notice via touch panel 72 of the user interface if the current date and/or time must be set. If a time reset is needed, a user may set the date and/or time via the touch panel 72 (or an external keyboard or other input device) of the user interface. Once the date and time have been verified by a user as being accurate, LED light 75 (i.e., the status light) is illuminated to indicate that the respirator container is operational.

When it is desired to begin a record for a new respirator such as respirator 20, RFID tag 22 or another unique identifying tag is attached to respirator 20. The user then selects "NEW MASK" from touch panel 72 of the user interface. If a respirator is already in sealable chamber 38, the user will be prompted by the controller to remove it. The new respirator is then placed within sealable chamber 38, and respirator-detecting sensor 68 verifies that respirator 20 has been placed in the sealable chamber. Furthermore, RFID reader 70 verifies that it can read the RFID tag 22 attached to respirator 20. When respirator-detecting sensor 68 and RFID reader 70 have signaled the controller that respirator 20 is in the sealable chamber and that its associated unique identifying tag can be read, the controller causes audible alarm 80 to transmit an audible acknowledgment. When door 40 is closed and latched with door latch 44, door switch 58 signals the controller that the door is closed. This condition will be indicated by a notice on touch panel 72, after which the user may enter the respirator and user data via the touch panel of the user interface, and press "OK" on the touch panel to open a new record file. Respirator 20 is now ready for use that can be automatically tracked according to the invention.

When the user subsequently removes respirator 20 from sealable chamber 38, the respirator-detecting sensor 68 will signal to the controller that respirator 20 has been removed, and mechanical stop 69 will prevent spring loaded hinge 66 from moving platen 64 too far upwardly. The controller will provide notice via touch panel 72 of the user interface that respirator 20 is OUT of sealable chamber 38, and the timer component of the controller will count the elapsed time down, and the same will be shown on the touch panel 72 of the user interface. If time remaining during the service period for respirator 20 gets below a predetermined threshold or if such time expires, the controller will notify the user by means of flashing LED light 76, and the controller will also cause audible alarm 80 to transmit an audible warning.

When, after some period of use, the user returns respirator 20 to sealable chamber 38, respirator-detecting sensor 68 will signal the controller that respirator 20 has been placed in the sealable chamber, RFID reader 70 will verify that it can read RFID tag 22 attached to respirator 20, and it will verify that RFID tag 22 matches a tag identifying number in the record for respirator 20. RFID reader 70 will signal the controller of these conditions, and the controller will cause audible alarm 80 to transmit an audible acknowledgment. When door 40 is closed and latched, door switch 58 will signal the controller that the door is closed. The controller will notify the user via touch panel 72 of the user interface that the door is closed and latched, and that respirator 20 is IN the sealable chamber. The controller will also cause the timer to stop counting down the time of use of respirator 20. The period of time that respirator 20 was out of the sealable chamber is determined by the controller and recorded in the active record file for respirator 20.

While respirator 20 is in sealable chamber 38, the controller will activate humidity sensor 88 to determine the humidity level within the sealable chamber. If the humidity is determined to be above a predetermined humidity limit, the controller will cause the dryer to be activated. After a predetermined dryer time period such as, for example, thirty minutes, the controller will again activate humidity sensor 88. If the humidity within the sealable chamber is still above a predetermined humidity limit and the dryer comprises a replaceable dryer element, the controller will cause LED light 76 to flash and audible alarm 80 to transmit an alarm signal to indicate that the dryer element should be replaced.

If door switch 58 determines that door 40 is open, but respirator-detecting sensor 68 does not indicate that respirator 20 has been removed from sealable chamber 38, the controller will cause the timer to count down. After a predetermined period of time such as, for example, sixty seconds, the controller will cause audible alarm 80 to provide an audible warning, and it will also cause LED light 76 to flash. If door 40 remains open without respirator 20 being removed for a predetermined period of time such as, for example, five minutes, the controller will count down time of the service period as if the respirator had been removed from the sealable chamber.

When the controller has notified a user that the service period for a particular respirator has expired, the user may press "RETIRE MASK" on touch panel 72 of the user interface. The controller will then query the user via the touch screen to verify that the record file for the respirator should be closed. If the user indicates via the touch screen that the file should be closed, the controller will close the file. The respirator may then be removed from the sealable chamber and discarded, or if applicable, its replaceable filtration cartridge may be replaced. If an Ethernet connection is available through the Ethernet port 82, a record file for the retired respirator can be emailed to the designated email address. The respirator file may also be retrieved via USB port 74.

In the case of a loss of power or an intentional powering off of respirator container 36, the capacitor bank or other chargeable power supply component will provide a safe and secure shutdown procedure to prevent data loss or program corruption.

In all functions where a user can utilize the touch panel 72 portion of the user interface, a keyboard or other input device attached to USB port 74 may be used either in addition to or in place of the touch panel.

Figure 10:
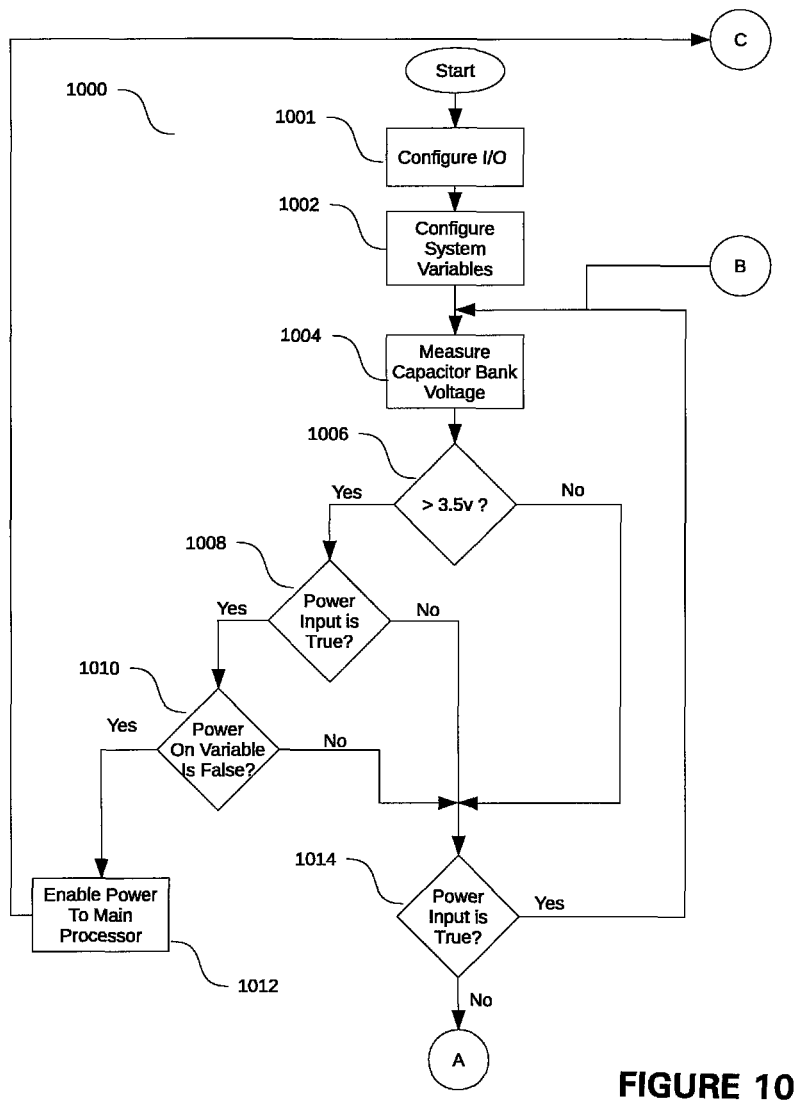
FIG. 10 is a flowchart for a software program for use in operating a preferred embodiment of the invention.
Figure 10:
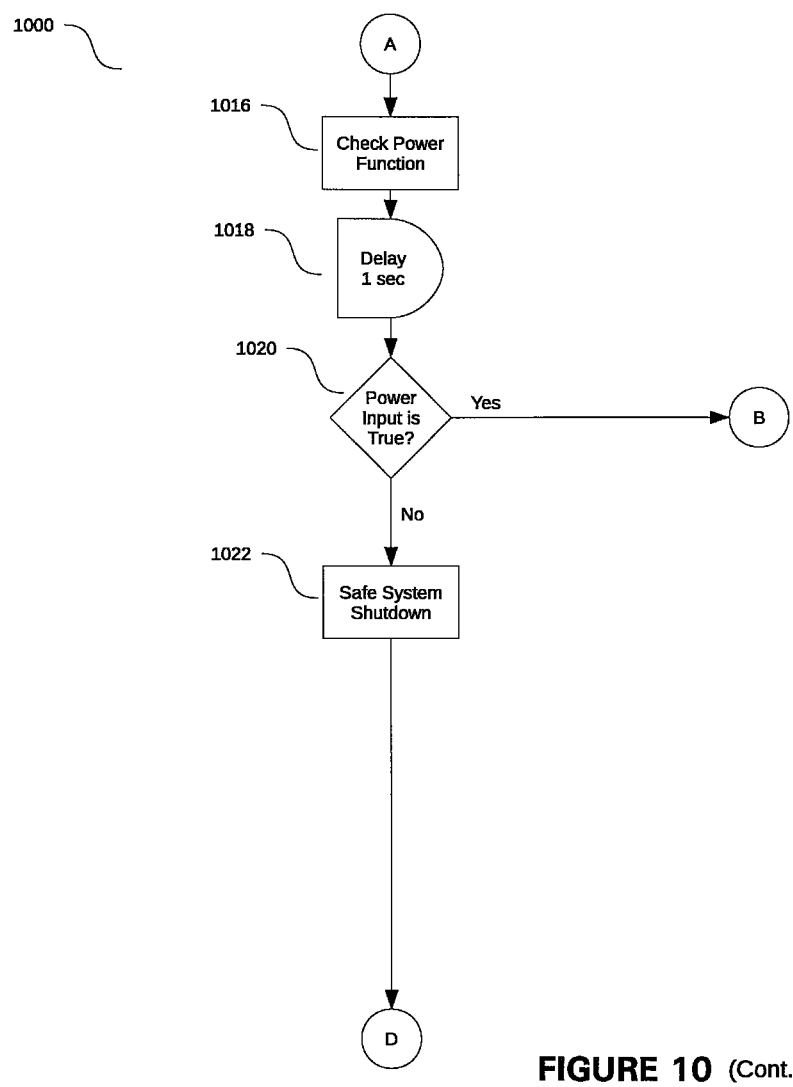
Figure 10:
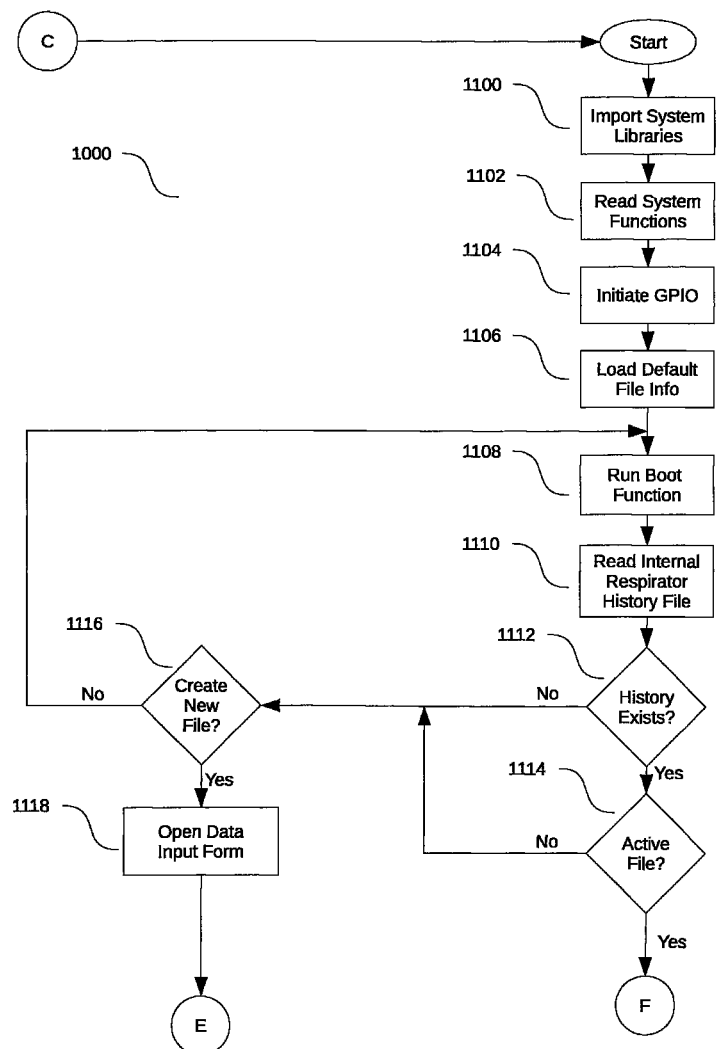
Figure 10:
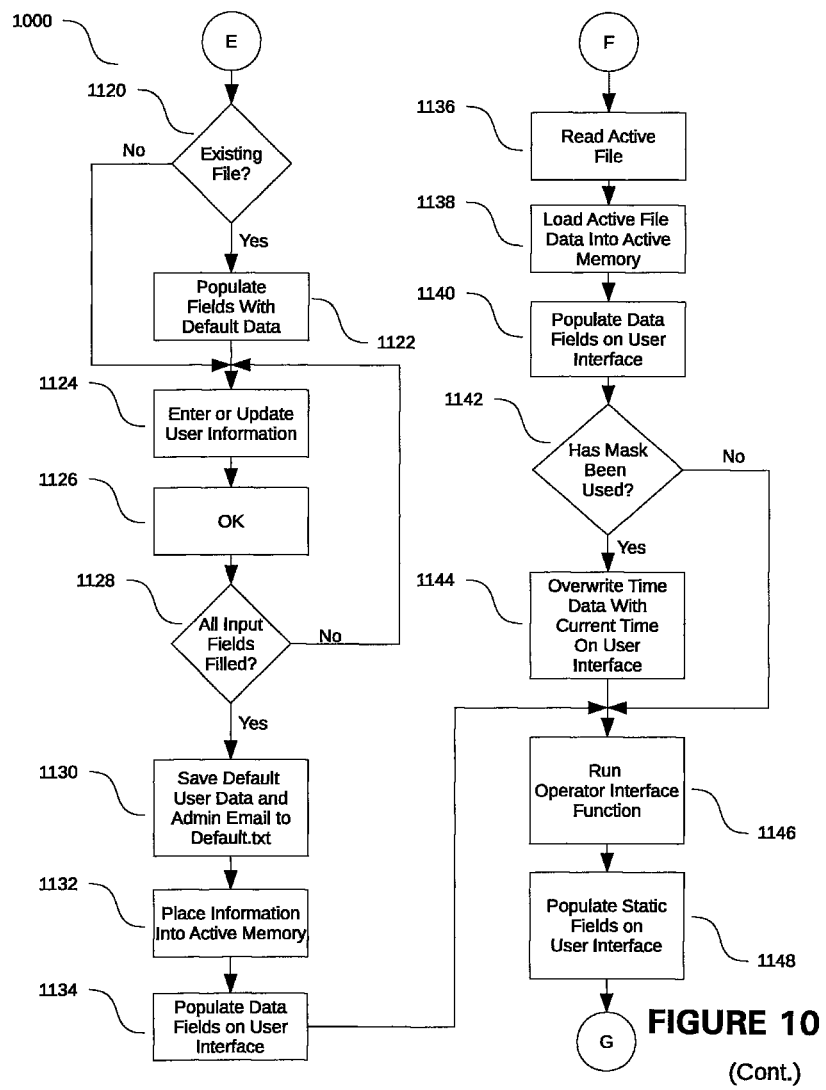
Figure 10:
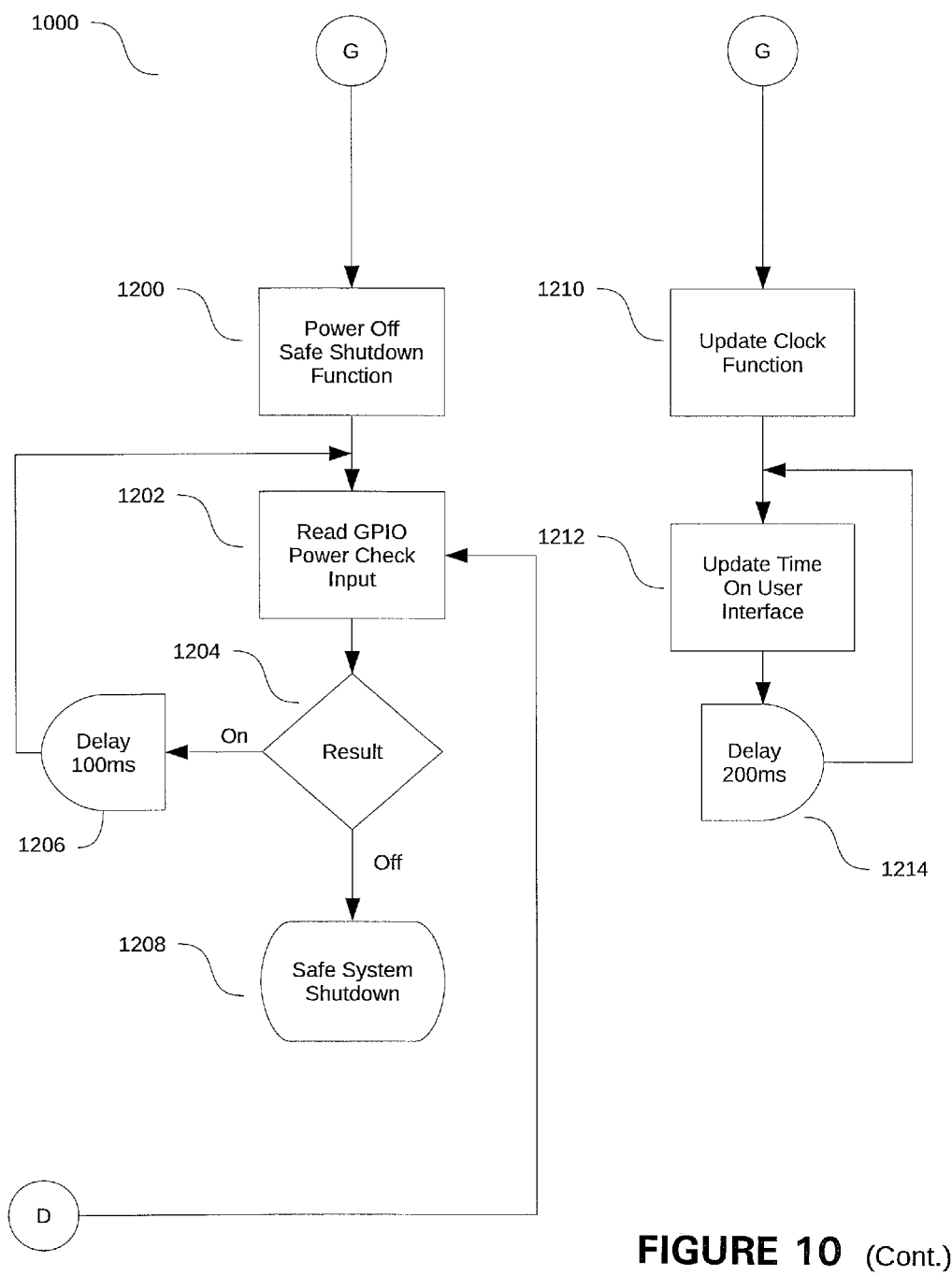
Figure 10:
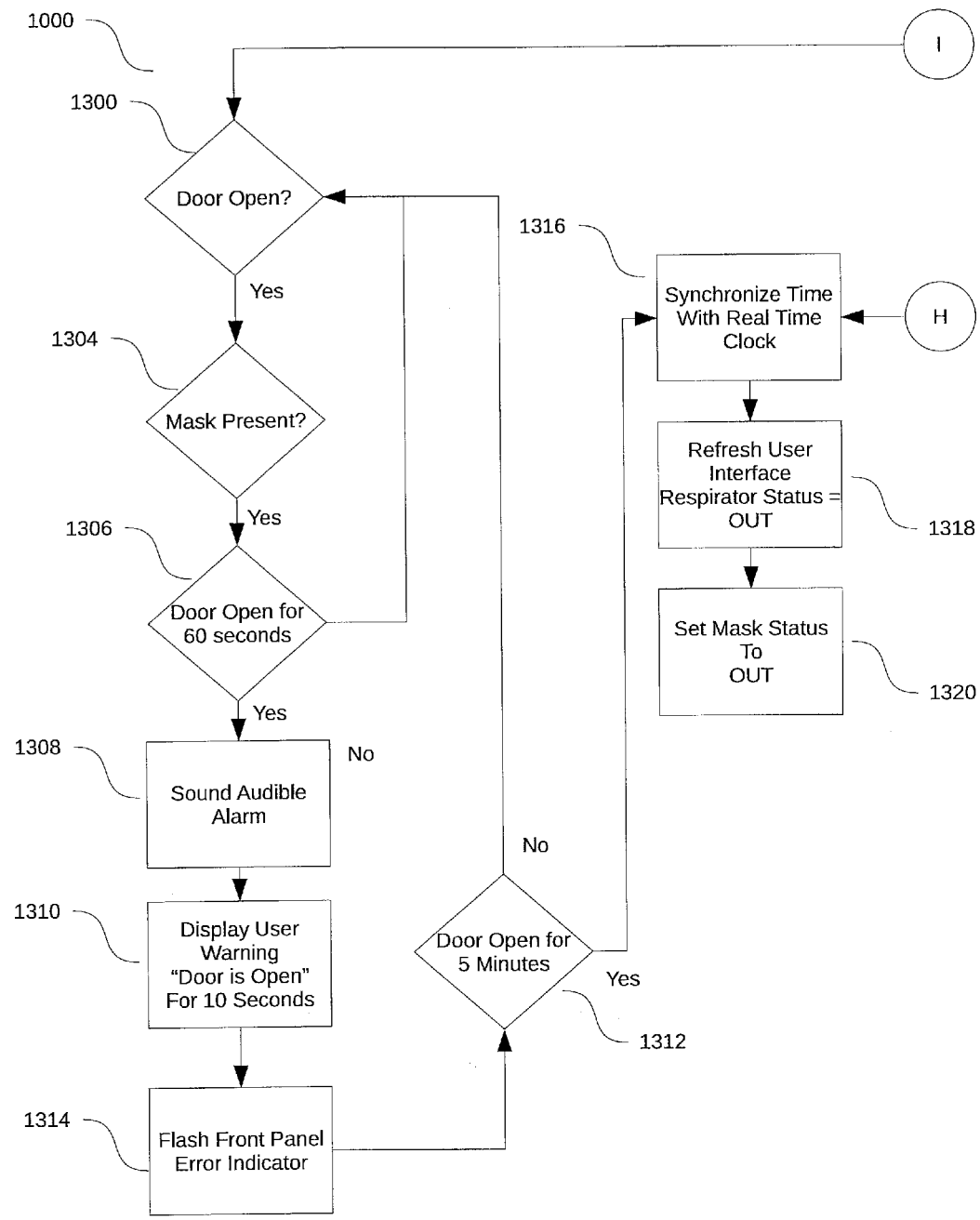
Figure 10:
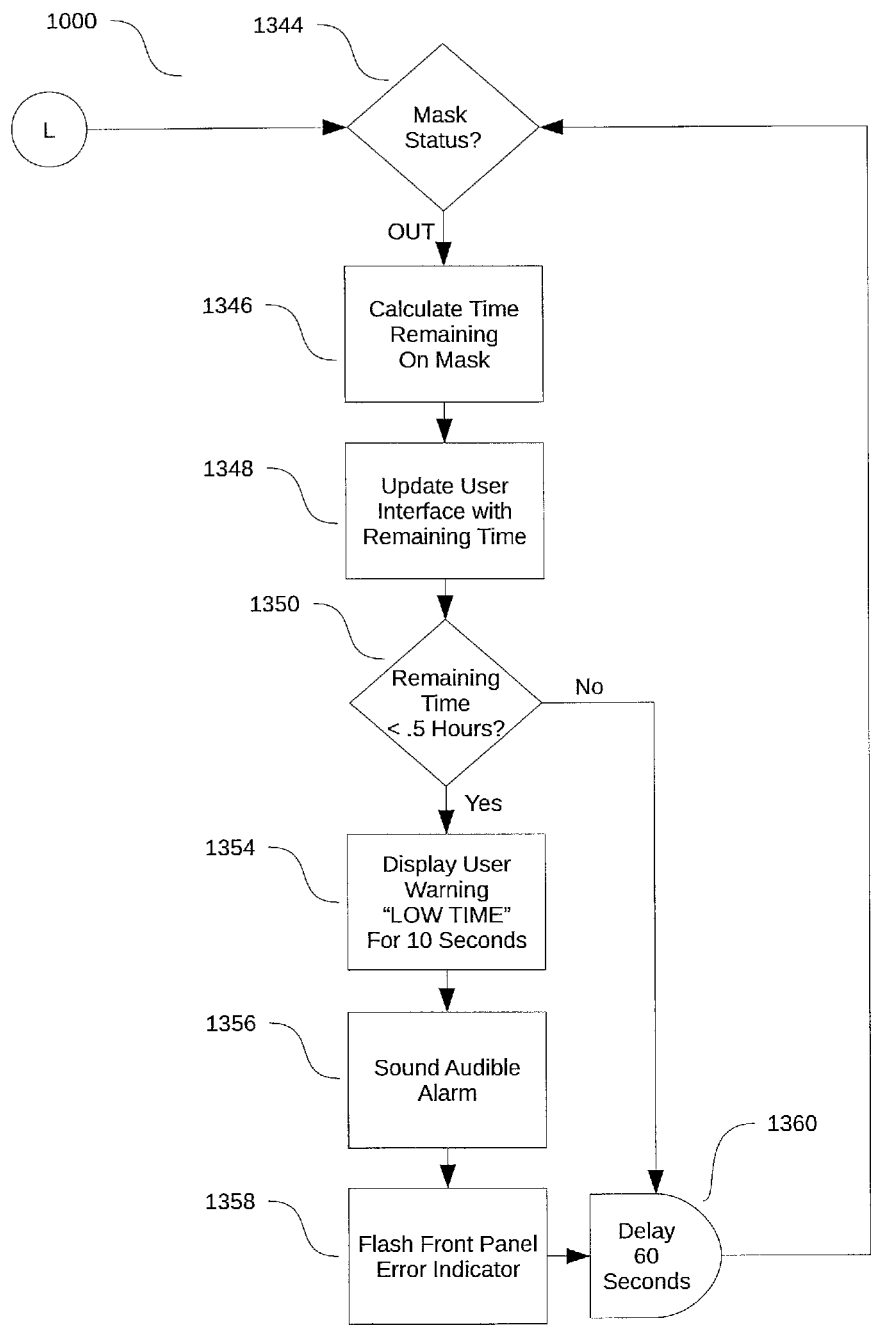
Figure 10:
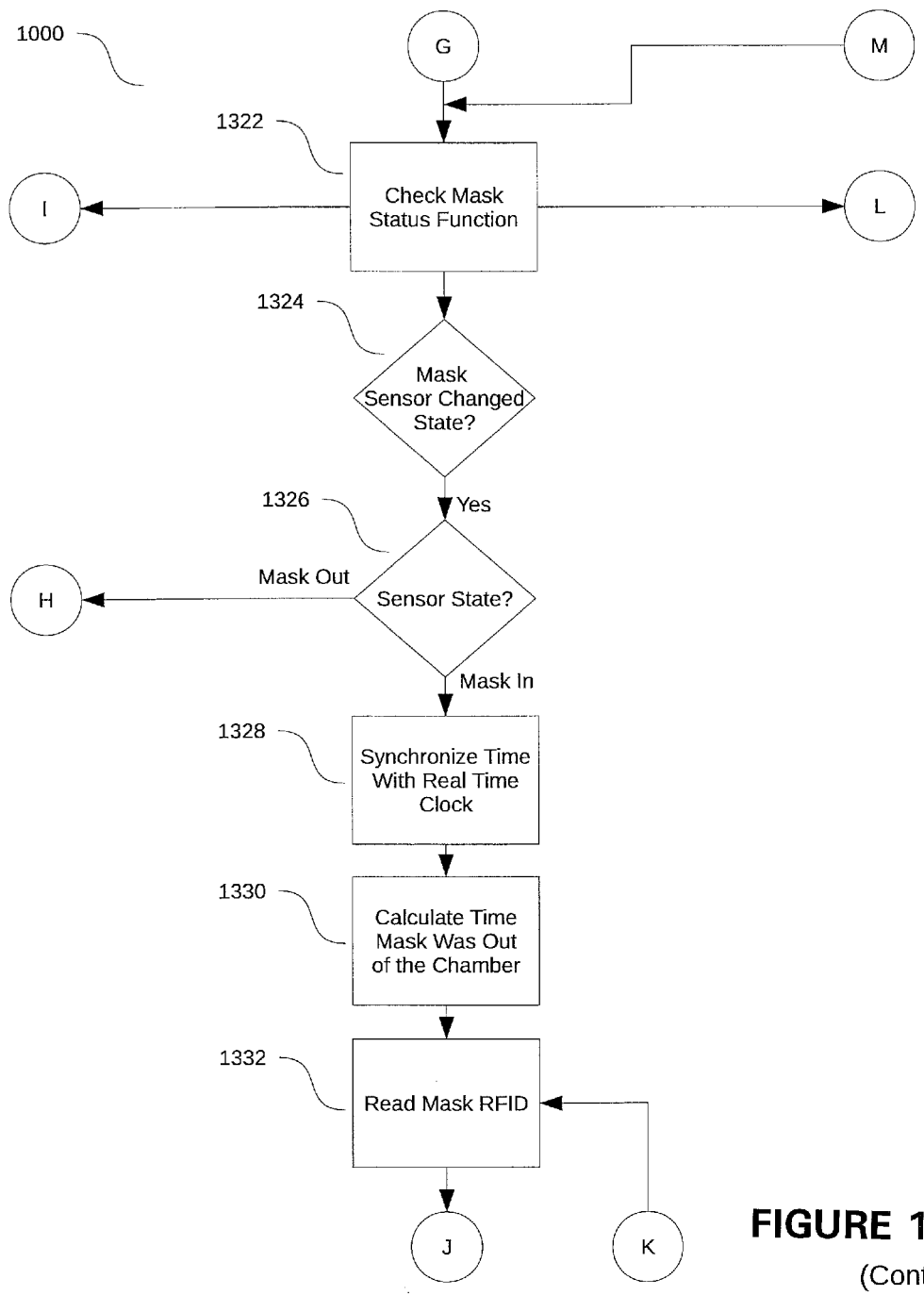
Figure 10:
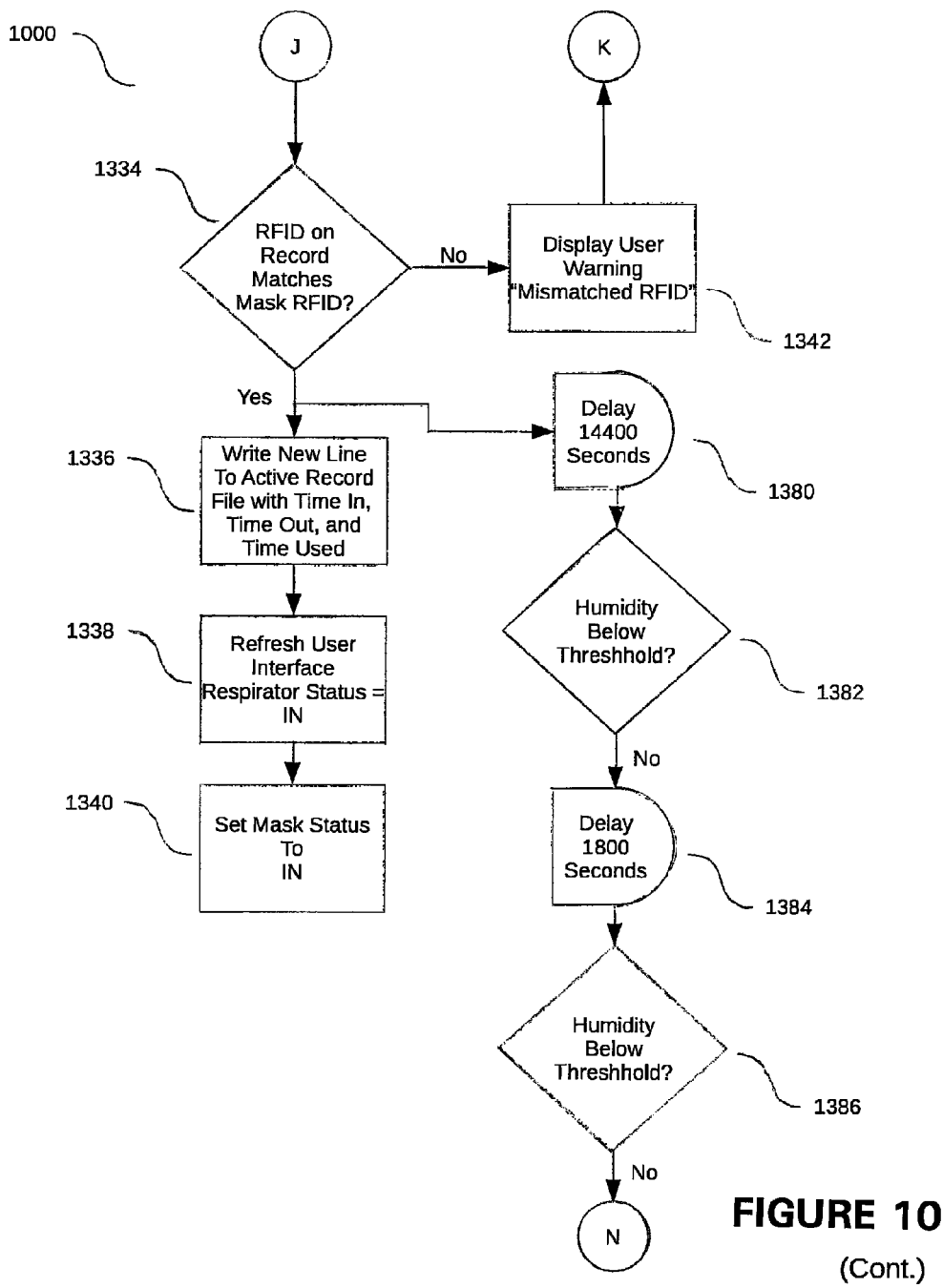
Figure 10:
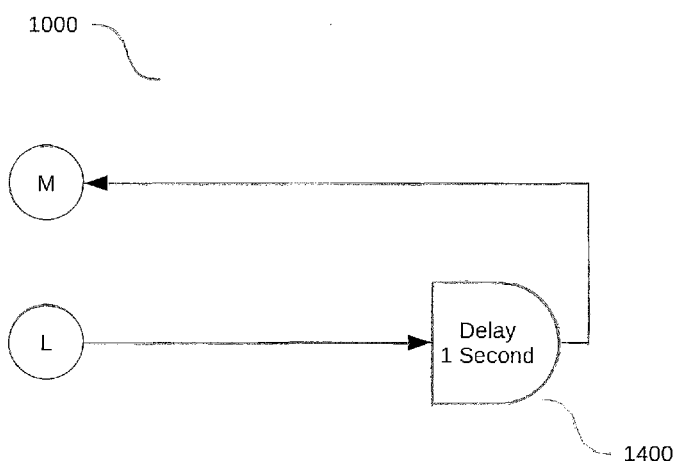
Figure 10:
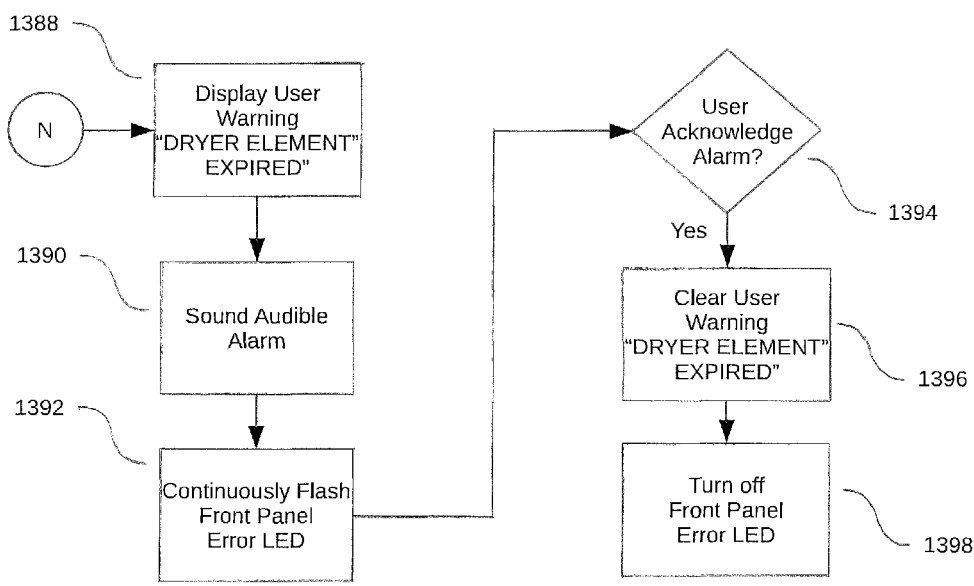

FIG. 10 (comprising ten sheets) is a flowchart for a software program 1000 for use in operating a preferred embodiment of the invention. As shown therein, the process begins with step 1001 when all of the applicable inputs and outputs of the controller are configured to accept or send data as required. At step 1002, global system variables are configured in the controller to be used as needed throughout the various steps of program 1000. At step 1004, the input/output section of the controller measures the voltage in the capacitor bank or other power storage component. At step 1006, if the measured voltage in the capacitor bank does not meet a predetermined minimum voltage required for safe operation and subsequent controlled shutdown of the respirator container, such as, for example, 3.5V, the input/output section of the controller will check at step 1014 that power input is still available. If power is still available, the input/output section of the controller will continue to measure capacitor bank voltage at step 1004 until the capacitor bank is charged to the point that the predetermined minimum voltage is obtained.

If the input/output section of the controller determines at step 1006 that the predetermined minimum voltage has been obtained, the input/output section of the controller will check at step 1008 to determine if power input is still available. A check at step 1010 verifies that processor 60 is not already powered. If these conditions are met, power is enabled to processor 60 at step 1012. If at any time during the power-up stage, power becomes unavailable, the input/output section of the controller will initiate a controlled shutdown. Once the system is fully powered and processor 60 is running, at step 1016 a check of the power function is initiated. Step 1018 comprises a one-second delay (or other suitable delay) for checking the power function. After the passage of the delay period, the input/output section of the controller checks that power is still available at step 1020. If power is still available, the input/output section of the controller loops back to the beginning of the check power function, at step 1016. This function loop runs continuously every second during the entire time processor 60 is powered. Once processor 60 receives power at step 1012, the processor will power up and performs its system setup functions. At step 1100, the controller imports necessary system libraries. At step 1102, the controller reads all of the system functions into RAM. At step 1104, the controller initiates the General Purpose Inputs and Outputs ("GPIO") required to interact with the user interface as well as the respirator container itself.

At step 1106, the controller reads in the default file information. This file contains all of the default user information to assist a user in starting a new respirator file. At step 1108, the controller starts the boot function. At step 1110, the controller reads the internal history file looking for an active record. If there are no records in the history file, at step 1112, or if there is no active record in the history file, at step 1114, the controller will prompt the user to start a new file. If at step 1116, the user elects not to start a new file, the controller loops the program back to step 1108, where it will read the history file again. The process cannot continue outside of this loop until the user elects to create a new file. Once the user has elected to create a new respirator file, at step 1116, the controller opens the data input form at step 1118. Then, at step 1120, the controller checks to determine if the identified user has ever had a user file. If there is a file on record, the data fields are populated with information from the last record at step 1122; otherwise the fields are left blank, and the user is required to enter (or given the opportunity to update) the file information at step 1124. Once the data is entered, the operator presses 'OK' at step 1126. Then, at step 1128, the controller checks that all fields are filled correctly and loops back to step 1124 if they are not. If all fields are filled in correctly, at step 1130, the new data is saved to the default user file and at step 1132, the new data is saved to active memory. At step 1134, the touch screen user interface is populated with the new (or updated) user data.

Back at step 1114, if an active user file is found, the controller reads the active file at step 1136 and loads the file into active memory at step 1138. At step 1140, the touch screen user interface is populated with the active user data. At step 1142, the controller checks to determine whether the respirator has been used. If it has, at step 1144, the controller overwrites the time data with the current respirator time on the touch panel user interface.

Step 1146 starts the user interface function. At step 1148, the controller populates all of the static label fields on the touch panel user interface. At this point in the program, several functions operate simultaneously. The controller begins the clock update sequence at step 1210. At step 1212, the touch panel user interface is updated to the current time. After a delay of 200 ms (or other suitable period) comprising step 1214, this function repeats.

At step 1200, the controller starts the power off check function. At step 1202, the controller reads the GPIO input, checking for power. The result of this check is evaluated at step 1204. If power is still available, the controller waits 100 ms (or other suitable period) at step 1206, and repeats the check function. If power is no longer available, the input/output section of the controller initiates a controlled shutdown at step 1208, which prevents data loss and/or program corruption that may arise from a sudden loss of power.

At step 1322, the controller begins the check respirator function. This function encompasses all of the programming necessary to track the respirator's entering and leaving the sealable chamber. At step 1324, the controller checks the unique identifying tag for the respirator for a change of state. If the controller detects a change of state, at 1326, the controller checks to determine if the respirator is IN or OUT of the sealable chamber. If the respirator is OUT of the sealable chamber, at step 1316, the controller synchronizes the system time with the onboard real time clock. At step 1318, the controller updates the user interface to indicate that the respirator is OUT, and at step 1320, the controller sets a global variable indicating that the respirator is OUT of the sealable chamber.

If at step 1326, the controller determines that the respirator has been placed back in the sealable chamber, at step 1328, the controller synchronizes the system time with the onboard real time clock. At step 1330, the controller calculates the time that the respirator was out of the sealable chamber. At step 1332, the controller reads the respirator RFID tag, and at step 1334, it compares the RFID tag identifying number to the number on file. If the numbers do not match, at step 1342, the controller displays a warning on the operator interface and loops back to step 1332 while waiting for the user to place the correct respirator in the sealable chamber. If at step 1334, the controller determines that the RFID numbers match, at step 1336, the controller creates a new line in the active record file with the time the respirator was removed from the sealable chamber, the time the respirator was returned, and the total time it was outside the sealable chamber. At step 1338, the controller updates the user interface to indicate that the respirator is IN and at step 1340, the controller sets a global variable indicating that the respirator is IN. Every 60 seconds (or other suitable period), the controller checks the respirator status at step 1344. If the controller determines that the respirator is in the sealable chamber, no action is taken. If, on the other hand, the controller determines that the respirator is out of the sealable chamber, at step 1346, the controller calculates the remaining portion of the rated service period for the respirator. At step 1348, the controller updates the user interface with the remaining amount of time. At step 1350, the controller checks to determine if the remaining time in the service period is less than thirty minutes (or other suitable warning period). If it is not, no action is taken. If the remaining portion of the service period is less than thirty minutes, at step 1354, the controller displays a "LOW TIME" warning on the user interface, and it sounds an audible alarm at step 1356, and it flashes LED light 76 (indicating error). After a sixty second (or other suitable) delay comprising step 1360, this process is repeated.

Once the controller has verified that the respirator has been returned to the sealable chamber, step 1380 comprises a four-hour delay. After this period, at step 1382, the controller checks the humidity in the sealable chamber and compares it to a predetermined humidity limit. If the humidity is found to be at or below the predetermined limit, no further action is taken; however, if the humidity is above the predetermined limit, at step 1384, the controller activates the dryer for a period of thirty minutes (or, if the dryer comprises a replaceable dryer element that requires no activation, step 1384 comprises a thirty-minute delay). After this period, at step 1386, the controller checks the humidity in the sealed chamber and compares it to the predetermined humidity limit. If the humidity is again found to be above the predetermined limit, at step 1388 the controller will display a warning on the touch panel of the user interface to indicate that the dryer element should be replaced. The controller will also cause an audible alarm to sound at step 1390, and at step 1392 the controller will cause LED light 76 (indicating error). In order to stop the flashing of the error light, the user must acknowledge the warning using the touch panel at step 1394. When this step is taken, the controller will stop the flashing of LED light 76 at step 1396 and clear the warning from the touch panel at step 1398.

At step 1300, the controller will continuously check to determine if the door to the sealable chamber has been opened. If the door is opened, the controller checks at step 1304 to determine if the respirator is present in the sealable chamber. If the controller determines that the respirator is not in the sealable chamber, no further action is taken. However, if the controller determines that the respirator is in the sealable chamber, at step 1306, the controller checks to determine whether the door has been open for at least sixty seconds (or other suitable predetermined time). If the controller determines that the door has not been left open for the predetermined time, the controller will do nothing until either the door is closed or it has been opened for at least sixty seconds. However, after the door has been left open for the predetermined time, the controller will sound an audible alarm at step 1308, and will display a "DOOR IS OPEN" warning on the touch screen of the user interface at step 1310. In addition, the controller will cause LED light 76 to flash at step 1314. This process is repeated continuously until either the door is closed or the door has been opened for more than five minutes (or other suitable period). If the controller determines, at step 1312, that the door has been open for more than five minutes with the respirator in the sealable chamber, the controller will operate as if the respirator had not been returned to the sealable chamber. At step 1316, the controller will synchronize the internal system time with the onboard real time clock, and at step 1318, the controller will update the user interface to indicate the respirator is OUT of the sealable chamber. At step 1320, the controller will set a global variable indicating that the respirator is OUT. Step 1400 comprises a one-second interval after which the controller will check the status of the respirator at step 1322.

Although this description contains many specifics, these should not be construed as limiting the scope of the invention, but as merely providing illustrations of the presently preferred embodiment thereof, as well as the best mode contemplated by the inventors of carrying out the invention. The invention, as described herein, is susceptible to various modifications and adaptations, as would be understood by those having ordinary skill in the art to which the invention relates.

What is claimed is:
1. A respirator container comprising:
 (a) a sealable chamber that is adapted to receive and contain a respirator having a unique identifying tag;
 (b) a reader for reading the unique identifying tag of the respirator in the sealable chamber;
 (c) a timer for measuring the time during which the respirator is outside of the sealable chamber;
 (d) a user interface by which a user may enter the service period for the respirator;
 (e) a controller that is operatively attached to the reader, the timer and the user interface, which controller is adapted to determine when the unique identifying tag of the respirator has been out of the sealable chamber for an amount of time equal to the service period for the respirator and to provide notice of the occurrence of this event by means of the user interface;
 (f) a door for the sealable chamber which may be opened to provide access to the interior thereof and closed to seal the sealable chamber;
 (g) a door switch that is operatively connected to the controller and adapted to signal the controller that the door is open or closed.

2. The respirator container of claim 1 wherein the reader for reading the unique identifying tag of the respirator is a radio frequency identification device reader.

3. The respirator container of claim 1 wherein the controller is adapted to generate a report of the amount of time the respirator has been out of the sealable chamber.

4. The respirator container of claim 1 wherein the controller is adapted to provide notice that the unique identifying tag of the respirator has been out of the sealable chamber for an amount of time equal to the service period for the respirator less a predetermined warning period.

5. The respirator container of claim 1 which includes a respirator-detecting sensor that is operatively connected to the controller and adapted to signal the controller that the respirator is or is not in the sealable chamber.

6. The respirator container of claim 1:
 (a) wherein the timer is adapted to measure the time during which the door is open;

(b) which includes a respirator-detecting sensor that is operatively connected to the controller and adapted to signal the controller that the respirator is or is not in the sealable chamber;

wherein the controller is adapted to provide notice that the door has been opened for a predetermined open door time while the respirator is in the sealable chamber.

7. The respirator container of claim 1 which includes:
(a) a dryer that is operatively connected to the controller and adapted to reduce the humidity level within the sealable chamber;
(b) a humidity sensor that is operatively connected to the controller and adapted to determine the humidity level within the sealable chamber;

wherein the controller is adapted to activate the dryer when the humidity level within the sealable chamber is above a predetermined humidity limit.

8. The respirator container of claim 1 which includes:
(a) a replaceable dryer element that is adapted to reduce the humidity level within the sealed chamber;
(b) a humidity sensor that is operatively connected to the controller and adapted to determine the humidity level within the sealable chamber;

wherein the controller is adapted to provide notice that the dryer element needs to be replaced if the humidity level in the sealable chamber remains above a predetermined humidity limit when a predetermined dryer time has elapsed after the respirator is placed in the sealable chamber.

9. The respirator container of claim 1:
(a) which includes a power storage component that is adapted to be charged to a voltage level exceeding a predetermined minimum voltage;
(b) wherein the controller is adapted to cause a controlled shutdown of the respirator container if the voltage level in the power storage component falls below the predetermined minimum voltage.

10. A respirator container comprising:
(a) a plurality of sealable chambers, each of which:
 (i) is adapted to receive and contain a respirator having a unique identifying tag;
 (ii) includes a door which may be opened to provide access to the interior thereof and closed to seal the sealable chamber;
 (iii) includes a door switch that is associated with the door for the sealable chamber;
(b) a reader that is associated with each of the plurality of sealable chambers for reading the unique identifying tag of the respirator in the sealable chamber with which it is associated;
(c) a timer for measuring the time during which the respirator is outside of the plurality of sealable chambers;
(d) a user interface by which a user may enter the service period for the respirator;
(e) a controller that is operatively attached to each of the readers, each of the door switches, the timer and the user interface, which controller is adapted to:
 (i) determine when the unique identifying tag of the respirator has been outside of the plurality of sealable chambers for an amount of time equal to the service period for the respirator and to provide notice of the occurrence of this event by means of the user interface;
 (ii) receive a signal from each door switch indicating whether the door with which the door switch is associated is open or closed.

11. The respirator container of claim 10 wherein the controller is adapted to provide notice that the unique identifying tag of the respirator has been out of the plurality of sealable chambers for an amount of time equal to the service period for the respirator less a predetermined warning period.

12. A method for tracking the period of use of a respirator having a service period, said method comprising:
(a) attaching a unique identifying tag to the respirator;
(b) providing a respirator container comprising:
 (i) a sealable chamber that is adapted to receive and contain the respirator to which the unique identifying tag is attached, said sealable chamber including a door which may be opened to provide access to the interior thereof and closed to seal the sealable chamber;
 (ii) a reader for reading the unique identifying tag that is attached to the respirator while the respirator is in the sealable chamber;
 (iii) a timer for measuring the time during which the respirator is outside of the sealable chamber;
 (iv) a user interface by which a user may enter the service period for the respirator, may create a record that is associated with the unique identifying tag that is attached to the respirator, and may activate the timer;
 (v) a controller that is operatively attached to the reader, the timer and the user interface, which controller is adapted to receive and record the service period for the respirator, to determine when the unique identifying tag of the respirator has been out of the sealable chamber for an amount of time equal to the service period for the respirator, and to provide notice of the occurrence of this event by means of the user interface;
 (vi) a door switch that is operatively connected to the controller and adapted to signal the controller that the door is open or closed;
(c) entering the service period for the respirator by means of the user interface;
(d) creating a record that is associated with the unique identifying tag that is attached to the respirator by means of the user interface;
(e) activating the timer by means of the user interface.

* * * * *